US012784044B2

(12) United States Patent
Liao et al.

(10) Patent No.: US 12,784,044 B2
(45) **Date of Patent: *Nov. 3, 2026**

(54) TRUSTED CUSTOMER NETWORK

(71) Applicant: Stripe, LLC, South San Francisco, CA (US)

(72) Inventors: Kerwell Liao, Seattle, WA (US); Angel Maredia, New Rochelle, NY (US)

(73) Assignee: Stripe, LLC, South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/199,303

(22) Filed: May 5, 2025

(65) Prior Publication Data

US 2025/0265584 A1 Aug. 21, 2025

Related U.S. Application Data

(63) Continuation of application No. 18/077,028, filed on Dec. 7, 2022, now Pat. No. 12,321,935.

(51) Int. Cl.

*G06Q 20/40* (2012.01)
*G06Q 20/12* (2012.01)

(52) U.S. Cl.

CPC ........... *G06Q 20/401* (2013.01); *G06Q 20/12* (2013.01); *G06Q 20/4016* (2013.01); *G06Q 20/409* (2013.01)

(58) Field of Classification Search

CPC .. G06Q 20/401; G06Q 20/12; G06Q 20/4016; G06Q 20/409

See application file for complete search history.

(56) References Cited

U.S. PATENT DOCUMENTS

2009/0187492 A1* 7/2009 Hammad ............. G06Q 40/128 705/26.1
2010/0051684 A1* 3/2010 Powers .............. G06Q 20/4016 235/379
2016/0321669 A1* 11/2016 Beck ...................... G06Q 40/02
2022/0122087 A1* 4/2022 Gosset ................. G06Q 20/027

* cited by examiner

*Primary Examiner* — Raven E Yono
(74) *Attorney, Agent, or Firm* — BAKERHOSTETLER

(57) ABSTRACT

A user scans a payment card while setting up an account on a merchant's website, or while completing a check out to purchase an item or service for the first time. The subject system stores signals from the card scan (e.g., device ID, verified card, location, last time scanned and used, etc.). The next time a transaction is requested for the card at another merchant, the subject system can reference the last data it has on the card. If the transaction is being requested from the same device or a reasonably close physical location within a reasonable timeframe, the subject system can be highly confident that this is a legitimate transaction, without requiring the customer to scan their payment card again.

20 Claims, 10 Drawing Sheets

TRUSTED CUSTOMER NETWORK

CROSS-REFERENCE TO RELATED APPLICATIONS

This application is a continuation of U.S. patent application Ser. No. 18/077,028, entitled "Trusted Customer Network," filed on Dec. 7, 2022, the disclosure of which is hereby incorporated herein in its entirety.

TECHNICAL FIELD

The subject matter disclosed herein generally relates to verification of payment cards in online commercial transactions using a network-based computing environment.

BACKGROUND

Online transactions often include verification of payment cards (e.g., credit cards, and the like) to mitigate instances of fraud in such transactions. In some existing implementations, verification of payment cards involve customer interaction or user input to facilitate the verification.

BRIEF DESCRIPTION OF THE DRAWINGS

Some embodiments are illustrated by way of example and not limitation in the figures of the accompanying drawings.

DETAILED DESCRIPTION

Figure 1:
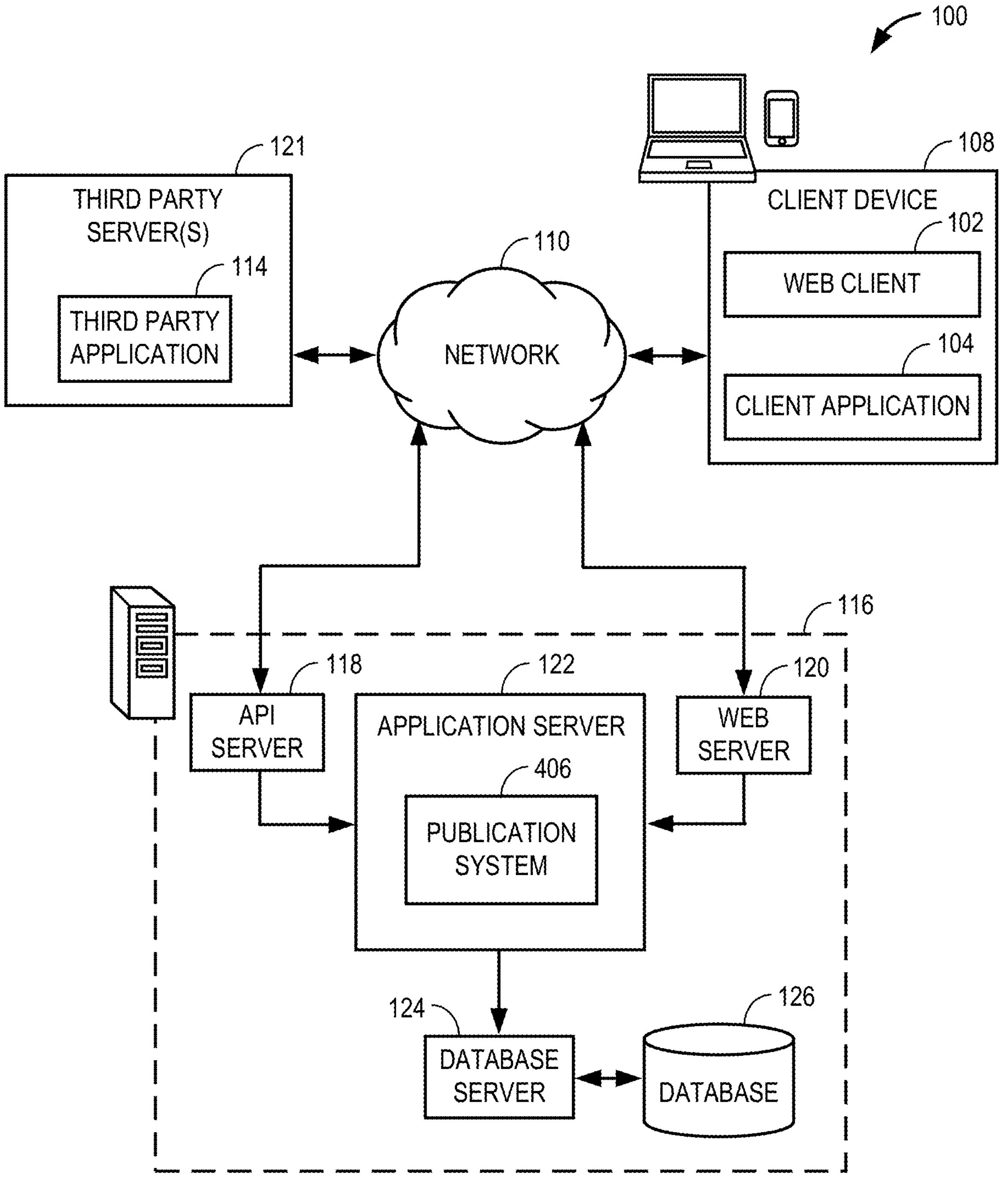
FIG. 1 is a block diagram illustrating a high-level network architecture, according to an example embodiment.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

One of the primary sources of credit card fraud arises from fraudsters using stolen credit card numbers (e.g., via phishing or purchasing credit card numbers from the dark web) to complete online transactions. This type of fraud is possible because fraudsters do not need to have the actual card in their possession, and simply need the information on the card.

Embodiments of the subject technology mitigate such instances of fraud through image verification of a given payment card (e.g., credit card, and the like), which requires customers to use their device (e.g., client device such as a smartphone, mobile computing device, and the like) to scan their physical payment card to prove the card is in their possession.

In an example, a user scans a payment card while setting up an account on a merchant's website, or while completing a check out to purchase an item or service for the first time. As discussed further herein, the subject system stores signals from the card scan (e.g., device ID, verified card, location, last time scanned and used, etc.). The next time a transaction is requested for the card at another merchant, the subject system can reference the last data it has on the card. If the transaction is being requested from the same device or a reasonably close physical location within a reasonable timeframe, the subject system can be highly confident that this is a legitimate transaction, without requiring the customer to scan their payment card again.

Although examples described herein involve scanning a physical payment card, in some instances a non-physical payment card (e.g., virtual credit card) is utilized for a given online transaction and scanning the non-physical payment card therefore is not feasible. Embodiments of the subject technology can instead verify a non-physical payment card utilizing techniques including providing an interface on a computing device to enter information associated with the non-physical payment card including, but not limited to, an address associated with the non-physical payment card, personal information of the card holder (e.g., date of birth), information related to a government-issued card (e.g., driver's license number, social security number, and the like), among other types of information. In other examples, embodiments can utilize other verification techniques to verify a non-physical payment card such as sending a one-time verification code to an email address of the card holder, and providing an interface for the user to enter in the verification code. As mentioned above, the next time a transaction is requested for the card at another merchant, the subject system can reference the last data it has on the card (e.g., the previous verification of the non-physical payment card).

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, CA (herein "Stripe") as an example of a payment processor 530) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 121, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
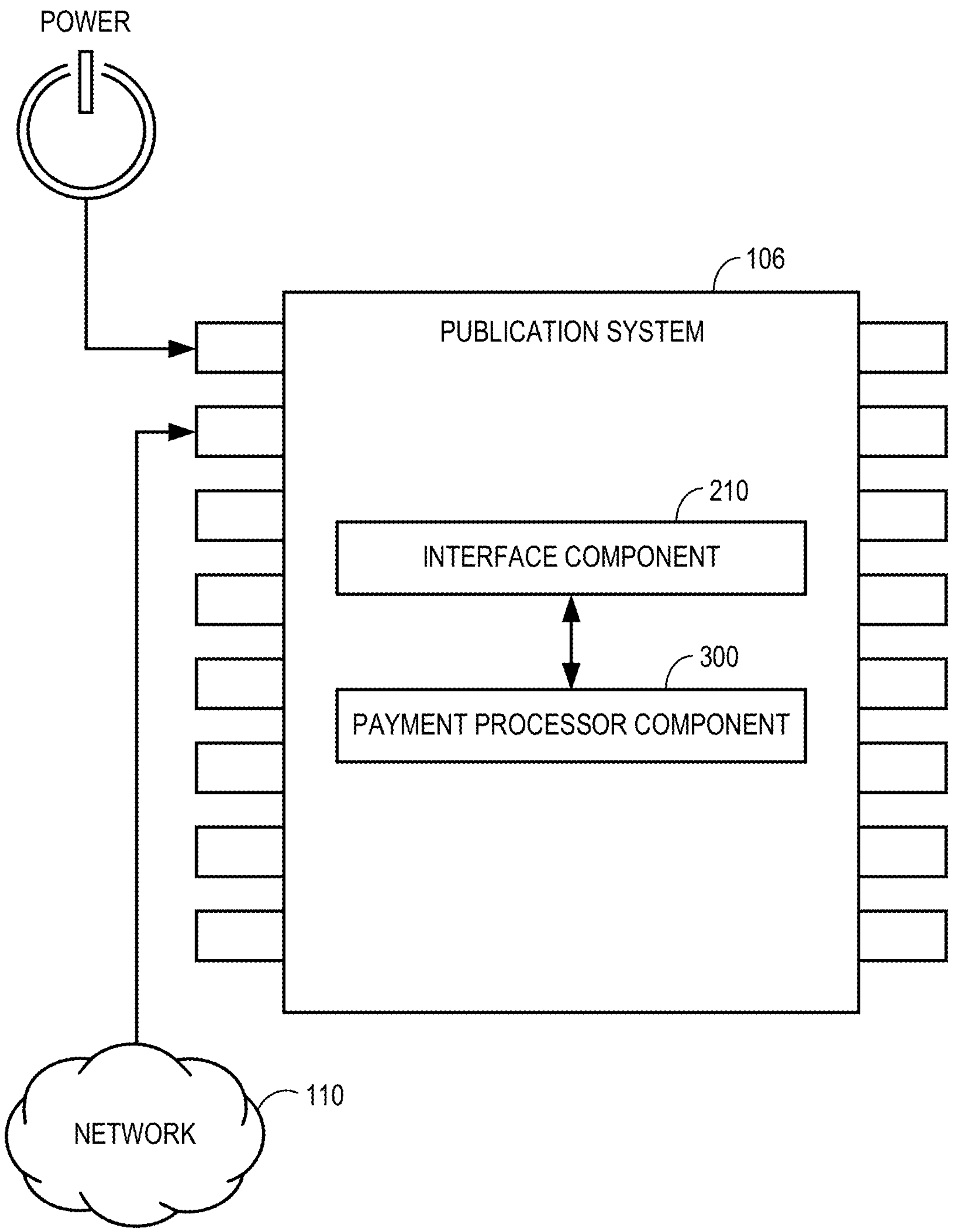
FIG. 2 is a block diagram showing architectural aspects of a publication system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over a network 110) with other systems within the SaaS network architecture 100.

The interface component 210 is communicatively coupled to a payment processor component 300 that operates to provide payment processing functions for a payment processor (e.g., a payment processor 530, FIG. 5) in accordance with the methods described herein with reference to the accompanying drawings.

Figure 3:
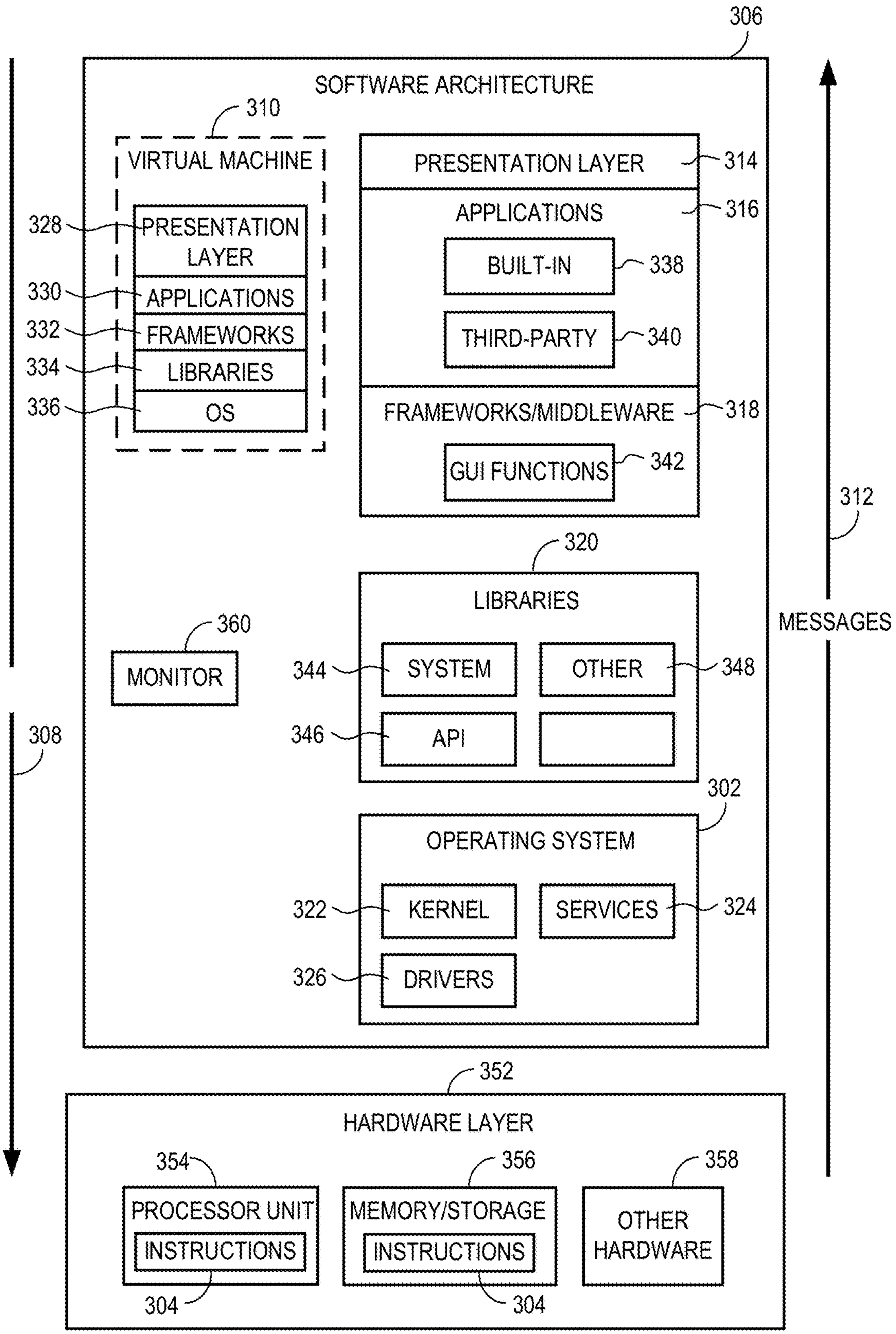
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking, security settings, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
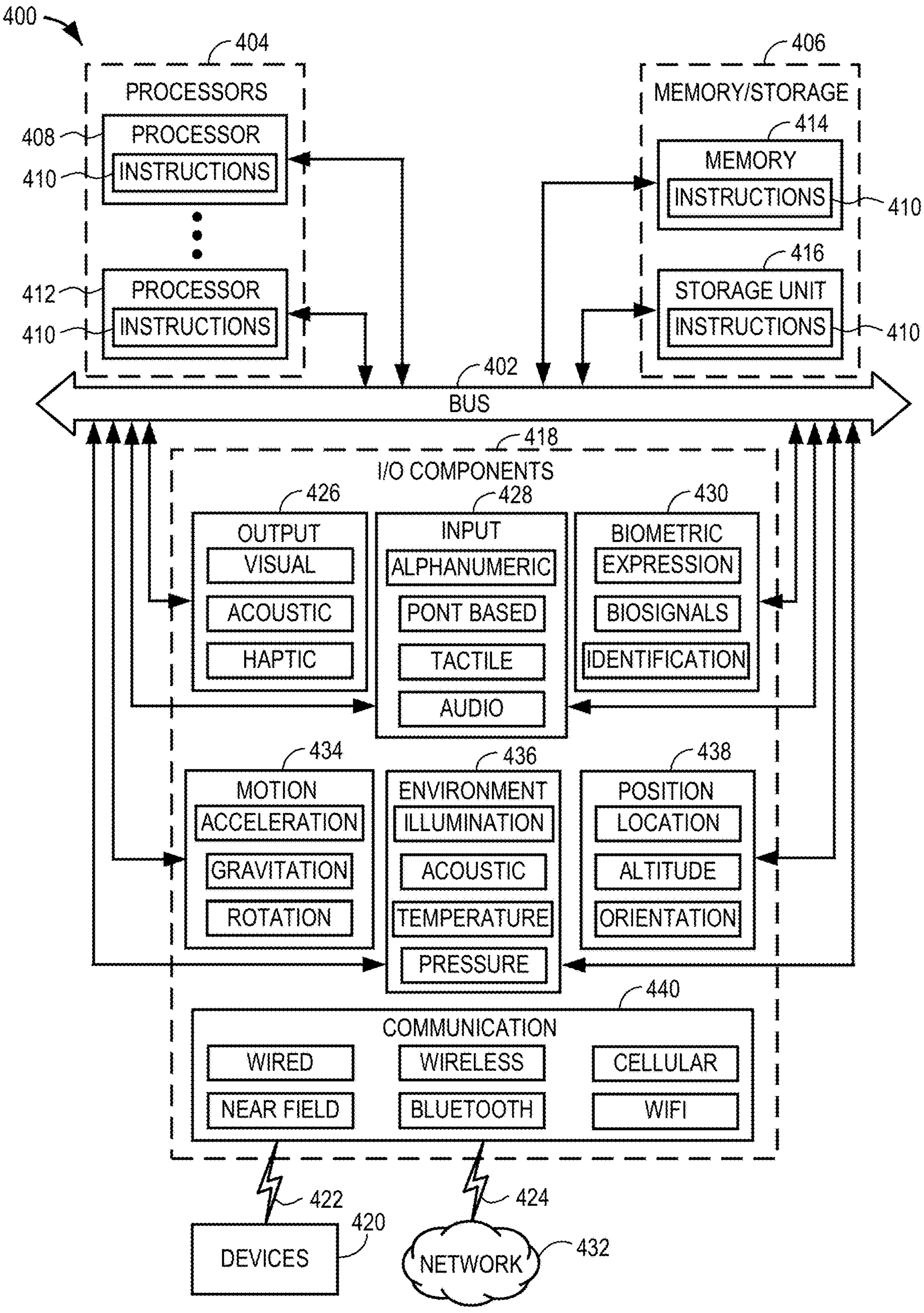
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting. In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

In some embodiments, a JavaScript library can be embedded into a merchant's checkout form to handle credit card information. When a user attempts to complete a transaction using the checkout form, it sends the credit card information directly from the user's browser to the payment processor's servers. The JavaScript library provides merchants with a set of technologies that can be easily and quickly integrated to securely accept payments online. With the JavaScript library, merchants retain full control of their customers' payment flows, but their servers are never exposed to sensitive payment information.

When added to a merchant's payment form, the JavaScript library automatically intercepts the payment form submission, sending payment information directly to the payment processor and converting it to a single-use token. The single-use token can be safely passed to the merchant's systems and used later to charge customers. Merchants have complete control of their customers' payment experience without ever handling, processing, or storing sensitive payment information.

Figure 5:
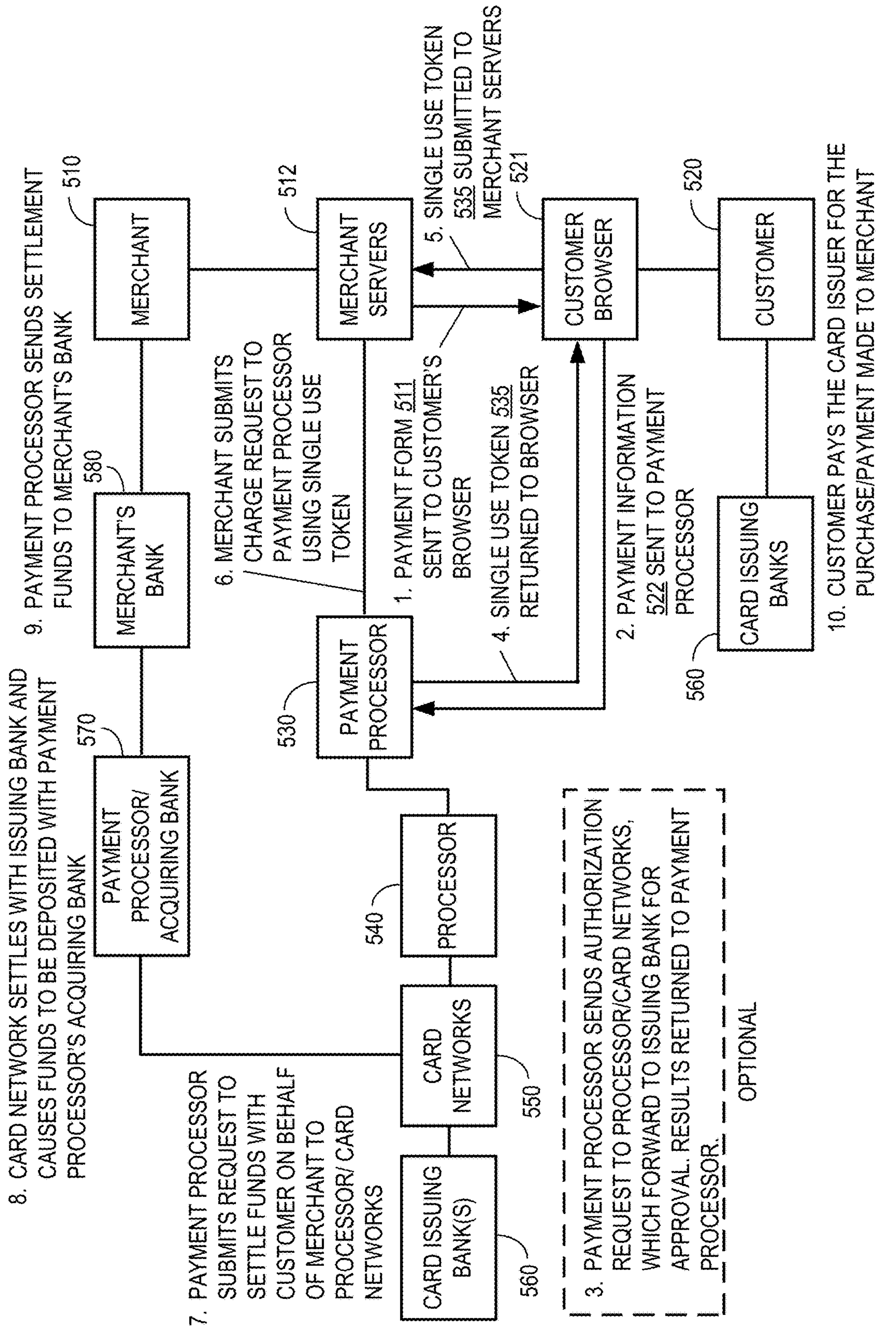
FIG. 5 conceptually illustrates examples of code showing aspects of an online method for conducting a transaction between a merchant site and an electronic user device using a payment processor, according to an example embodiment.

Viewed generally in one example, and with reference to FIG. 5, a payment processing flow is now described:

1. The merchant's customer 520 uses an Internet-enabled browser 521 to visit the merchant's site. The customer 520 is served a JavaScript library-enabled payment form 511 using standard web technologies. The customer 520 enters the specified information including their payment information 522 and submits the payment form 511. The billing info portion of the payment form 511 is for payment via a credit card or debit card. If payment is to be made via an ACH transaction, the billing info portion of the payment form 511 will request a bank routing number and an account number within that bank, and possibly additional information, such as the bank name and whether the account is a checking or savings account.

2. The customer's payment information 522 is sent from the customer's browser 521 to the payment processor 530, never touching the merchant servers 512. In this manner, the client-side application electronically sends payment information retrieved from the customer's electronic device to the payment processor 530. The client-side application does not send the payment information 522 to the server-side application. As mentioned before payment processor 530, in an implementation, is provided by payment processor component 300 that is part of publication system 106 (e.g., provided by application server 122).

3. In one preferred embodiment, the payment processor 530 submits the relevant transaction to a processor 540 or directly to the card network 550 for authorization or validation of the payment information. The card network 550 sends the request to the card issuing bank 560, which authorizes the transaction. In this embodiment, the payment processor 530 and the processor 540/card network 550 function together as a payment processor. In another example embodiment, this step is performed without any communication to the processor 540/card network 550. Instead, the payment processor 530 performs its own authorization or validation of the payment information using heuristic means, such as by checking the Bank Identification Number (BIN), also referred to as the Issuer Identification Number (IIN), against a database of known, valid BINs on file with the payment processor 530. (The BIN is a part of the bank card number, namely the first six digits.) In yet another example embodiment, this step is not performed at all since the authorization or validation is not necessary for the next step (4) to succeed. That is, it is acceptable to create a single-use token in step (4) that represents payment information which has not been validated in any way.
4. If authorized, the payment processor 530 will generate and return a secure, single-use token 535 to the customer's browser 521 that represents the customer's payment information but does not leak any sensitive information. In the example embodiment wherein step (3) is not performed, the payment processor 530 performs this step without waiting to receive authorization from the processor 540 or the card network 550. In this manner, the payment processor 530 creates the token 535 from the payment information sent by the client-side application, wherein the token 535 functions as a proxy for the payment information 522.
5. The payment form 511 is submitted to the merchant servers 512, including the single-use token 535. More specifically, the payment processor 530 sends the token 535 to the client-side application, which, in turn, sends the token 535 to the server-side application for use by the server-side application in conducting the transaction.
6. The merchant 510 uses the single-use token 535 to submit a charge request to the payment processor 530 (or to create a customer object for later use). In this step, the payment processor 530 submits a request to authorize the charge to the processor 540 or directly to the card network 550. This authorization specifies the actual amount to charge the credit card. If an authorization was already done in step (3) for the correct amount, this authorization request can be skipped. This may be a one-time payment for a merchant item, or it may involve registering the payment information with the merchant site for subsequent use in making a payment for a merchant item (a so-called "card on file" scenario). Using the process described in steps (1) through (6), the payment information can be used by the server-side application via the token 535 without the server-side application being exposed to the payment information.
7. The payment processor 530 settles the charge on behalf of the merchant 510 with the processor 540 or directly with the card network 550.
8. The card network 550 causes the funds to be paid by the card issuing bank 560 to the payment processor 530 or to the payment processor's acquiring bank 570.
9. The payment processor 530 causes the settled funds to be sent to the merchant 510 (or to the merchant's bank 580), net of any applicable fees.
10. The card issuing bank 560 collects the paid funds from the customer 520.

Not all of the steps listed above need happen in real time. Other examples, arrangements, and functionality are possible. Applicant's published patent application US 2013/0117185 A1 is incorporated by reference in its entirety in this regard. Typically, when the merchant's customer submits the payment form in step (1), steps (1) through (6) happen in real time and steps (7) through (10) happen later, usually once per day, as a batch process settling all of the funds for all of the payment processor's merchants. In some examples, the payment processor uses an HTTP-based tokenization API in steps (2) and (4) above. Some broader examples may be considered as "tokenization as a service," in which any data is tokenized. One general example may facilitate a merger and acquisition (M&A) analysis in which companies want to compare an overlap in their customer bases. A payment processor (acting as a tokenization service) can tokenize the customers of each company and compare the overlap without revealing confidential information to either party. Unique payment tokens can be adapted to enable and facilitate such a tokenization service.

Embodiments of the subject technology advantageously provide verification of payment cards that facilitate improved user experiences in completing online transactions in a commercial setting (e.g., purchasing goods or services, and the like). Moreover, it is appreciated that the subject technology reduces utilization of computing resources by forgoing unnecessary verification of payment cards (e.g., where the online transaction has a high probability of not being fraudulent) that results in an improvement of the functionality of a computer (e.g., payment processor or server). A payment card can be a credit card, debit card, or gift card, for example.

In existing approaches, payment card verification can occur too frequently in an attempt to mitigate fraud, and thereby introduce friction in completing a payment transaction (e.g., for purchase of goods or services, and the like) that causes a reduction in conversions (e.g., completing a transaction involving payment with a given payment card) on a given commercial website. Such payment card verification can include an image-based verification of a given payment card, which involves a client device capturing image data of a (physical) payment card to prove that the card is in the possession of a user making the online transaction.

By utilizing various signals (discussed further herein) provided by a given client device that is currently making a transaction using a payment card on a first website, along with prior signals or verification of the same payment card on other websites, the subject system can determine that, using at least a combination of such signals, a prior verification of the payment card is sufficient to forgo a verification process. This provides a more efficient system and ensures the security of the system by reducing fraud. In other instances, the subject system determines that a new verification of the payment card is to be initiated using the combination of signals and a prior verification (if available).

Figure 6:
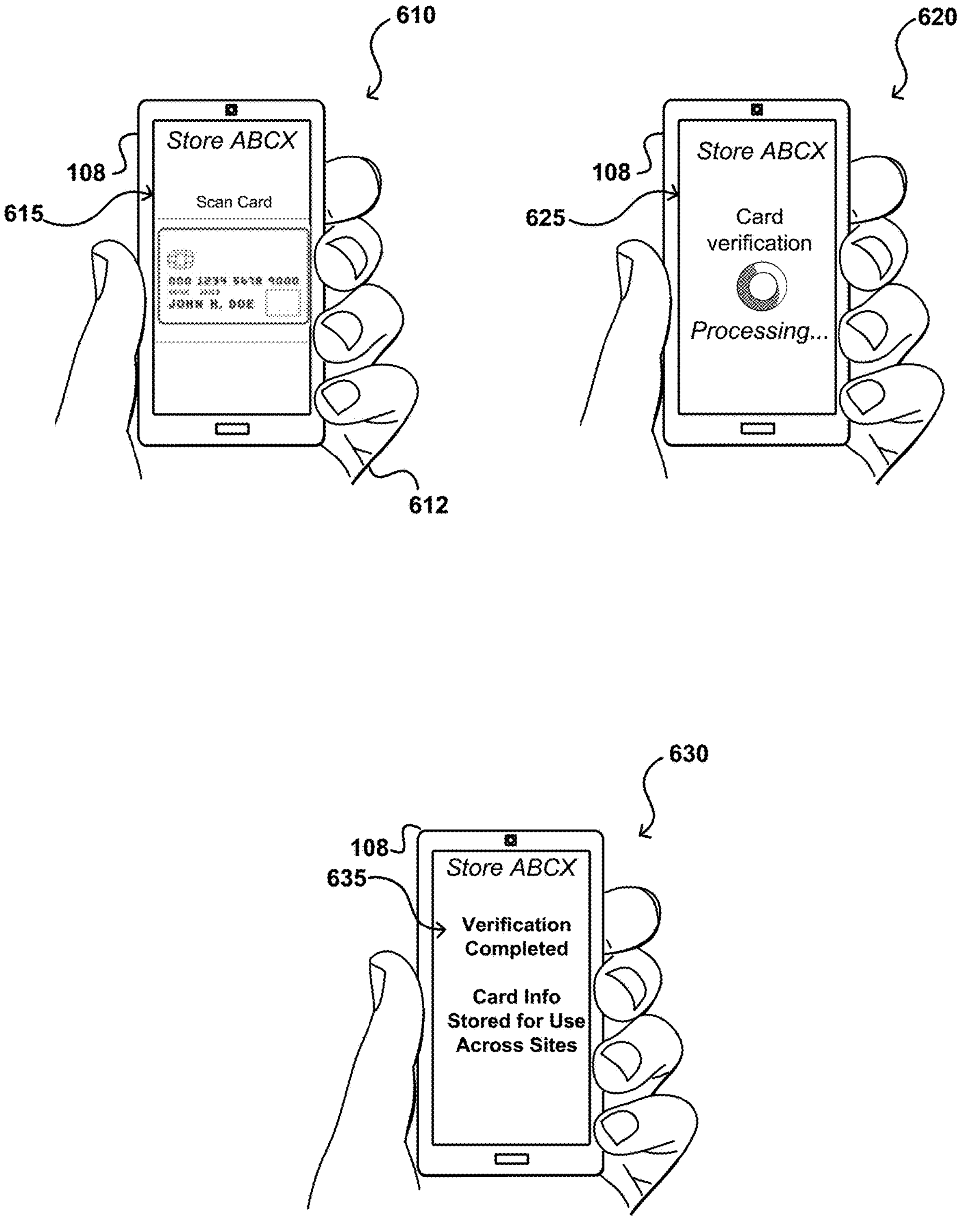
FIG. 6 conceptually illustrates examples of user interfaces for an initial verification of a payment card (e.g., the card has yet to be verified), according to example embodiments.

FIG. 6 conceptually illustrates examples of user interfaces for an initial verification of a payment card (e.g., the card has yet to be verified), according to example embodiments. In the examples described in FIG. 6, client device 108 performs various operations for a verification process in conjunction with networked system 116.

As illustrated in example 610, interface 615 is shown for display on client device 108 where a hand 612 is holding client device 108. In an embodiment, interface 615 is rendered for display by client device 108 (e.g., in a viewport of an application executing on client device 108), which can occur in response to determining that a payment card verification process is to be initiated in connection with a first online merchant (e.g., website corresponding to "Store ABCX").

In this example, interface 615 enables an image of a (physical) payment card, in a field of view of a camera (e.g., rear-facing camera) of client device 108, to be captured using the camera. The capture of the image can be initiated in response to a selection of selectable graphical item (not shown) in interface 615 such as a button. In an implementation, capture of the image is performed automatically in which client device 108 detects that the physical payment card is in a field of view corresponding to a graphical area within interface 615 where the image capturing is to take place. In this manner, a user can position the camera of the client device 108 to have the physical payment card within the appropriate graphical area of interface 615 (e.g., as shown in example 610).

After capturing an image of the payment card, the website (e.g., third party server 121) can send an API request, including the image, to API server 118 to complete the payment card verification process (discussed in further detail at least in FIG. 10 below). Upon receiving the API request, API server 118 communicates with application server 122 that performs, in an embodiment, operations in connection with the verification process. As discussed before, application server 122 includes publication system 106 that provides payment processor component 300, which includes payment processor 530. Although the examples described in FIG. 6, FIG. 7, and FIG. 8 mention application server 122, it is appreciated that any of the aforementioned components (e.g., publication system 106, payment processor component 300, payment processor 530) can perform the operations described in connection with application server 122 in these figures if appropriate.

API server 118 can provide an OCR API to enable card scanning functionality to extract information for verifying payment cards. In an example, imaging processing algorithms and recognition techniques may be used to detect payment card information from the image. For example, optical character recognition (OCR) can be used as a primary image analysis technique or to enhance other processes. Features (e.g., shape, size, color and text) of the image can be extracted. In some embodiments, image processing processes may include sub-processes such as, for example, thresholding (converting a grayscale image to black and white, or using separation based on a grayscale value), segmentation, blob extraction, pattern recognition, gauging (measuring object dimensions), positioning, edge detection, color analysis, filtering (e.g. morphological filtering) and template matching (finding, matching, or counting specific patterns), among other types of techniques.

Upon completion of one or more of the aforementioned image analysis or processing techniques, information including a payment card number, CVC number (also referred to as CVV), an expiry month, and an expiry year (among other types of information such as a name) can be extracted and provided for verification of the payment card.

In example 620, interface 625 is shown for display on client device 108 as an indicator of the payment card undergoing a verification process as performed by application server 122. Application server 122 sends results of the verification process to client device 108, which can be processed by client device 108 and displayed in a new interface. In an embodiment, the results are provided in a payload that includes a verification token that can be stored and utilized later to determine the prior verification results. The verification token can be in the form of a string of characters representing information related to the payment card (e.g., details about the payment card that was scanned such as BIN (first 6 digits) of the payment card, last 4 digits of the payment card, expiration month of the payment card, expiration year of the payment card, name of the payment card holder, or card issuer) and the verification results (e.g., whether successful or unsuccessful). Although a verification token is provided as an example, it is appreciated that other ways to store information related to the prior verification can be utilized and still be within the scope of the subject technology.

In example 630, interface 635 is shown for display on client device 108 including information (e.g., message) indicating a successful verification of the payment card by application server 122. Client device 108, as mentioned above, stores the verification token and other information corresponding to the payment card for future processing (e.g., to forgo additional verification of the payment card in a future transaction). Alternatively or conjunctively, application service 122 stores the same verification token.

Figure 7:
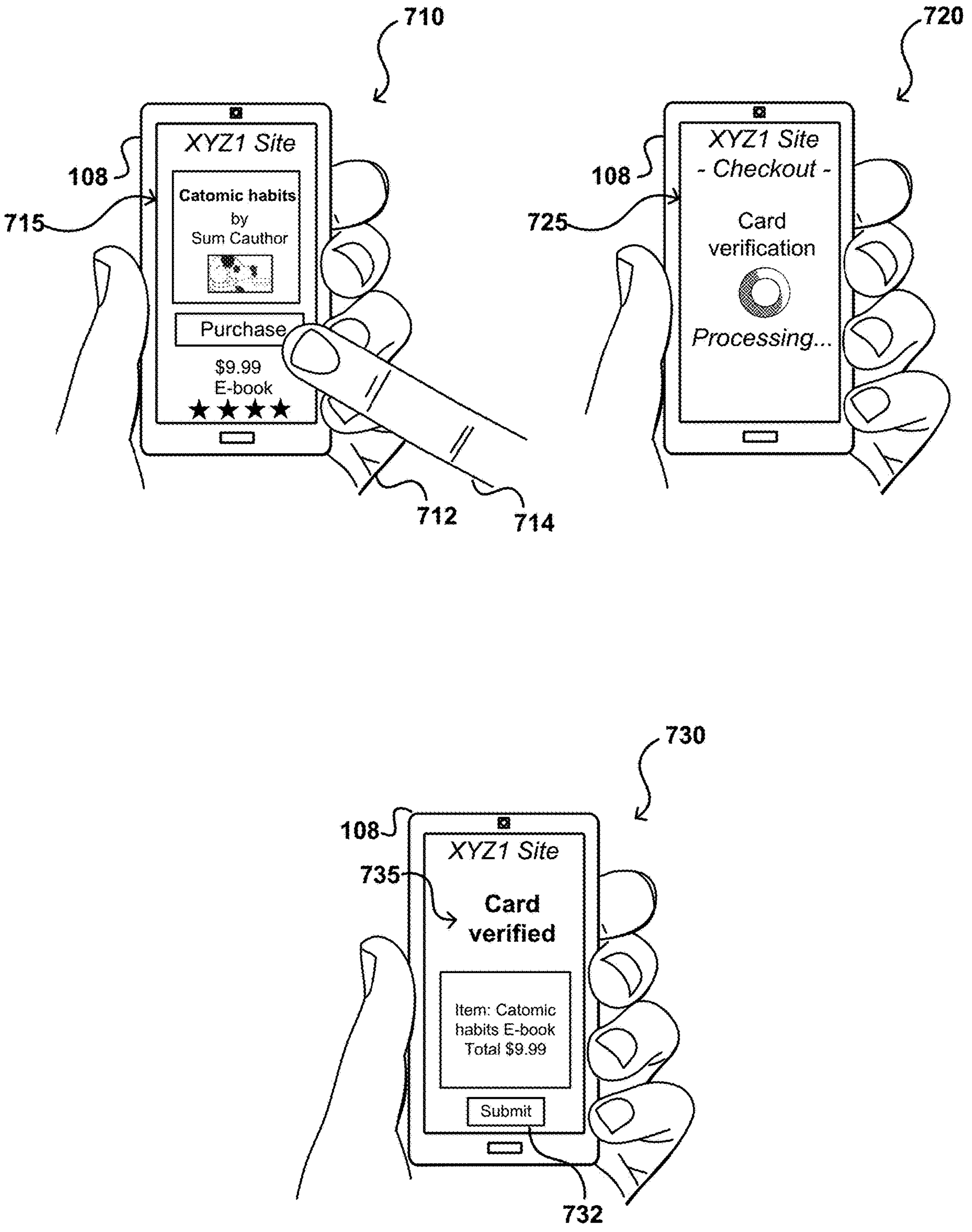
FIG. 7 conceptually illustrates examples of user interfaces for verification of a payment card using at least a prior verification, according to example embodiments.

FIG. 7 conceptually illustrates examples of user interfaces for verification of a payment card using at least a prior verification, according to example embodiments. Similar to FIG. 6, in the examples described in FIG. 7, client device 108 performs various operations for a verification process in conjunction with networked system 116 and is a continuation of the examples from FIG. 6 above.

As illustrated in example 710, interface 715 is shown for display on client device 108 where a hand 712 is holding client device 108. In an embodiment, interface 715 is rendered for display by client device 108 (e.g., in a viewport of an application executing on client device 108), which has occurred by navigating to a particular webpage of a different online merchant (e.g., provided by "XYZ1 Site") than the online merchant discussed in FIG. 6 (e.g., "Store ABCX"). A finger 714 is shown to provide a touch input (e.g., tap) to a selectable graphical item (e.g., purchase button) in interface 715.

In example 720, interface 725 is shown for display on client device 108 as an indicator of the payment card being verified by application server 122. As mentioned before, application server 122 sends results of the verification process to client device 108, which can be processed by client device 108 and displayed in a new interface. As the payment card was previously verified (as discussed in FIG. 6), application server 122 retrieves the previously stored verification token and determines that another verification process does not have to be performed for the payment card.

As discussed further in FIG. 10 below, the application server 122 (or components thereof) can compute a score to determine an indicator of risk (e.g., probability of fraud) in accepting the previous payment card verification, which the online merchant can utilize to decide whether to initiate an additional verification process (e.g., where the online merchant or system requires another image capture of the payment card as discussed in FIG. 6). As discussed further below, such a score can be determined based at least on device characteristics, information related to the transaction, various activity indicators, and the like.

In an embodiment, a machine learning (ML) model is utilized during a given transaction to generate the above-mentioned score. For example, a transaction may be received or associated with a set of metadata (e.g., payment card number, email address, IP address, tracking cookie, previous transaction details, previous verification details, and the like). The metadata is provided as input data to the machine learning model to determine a likelihood of fraud associated with the transaction, which is generated as the score and then provided as output data from the ML model(s). This likelihood can be mapped to a range of values (e.g., between 0.0 and 1.0), or other value(s).

In an implementation, in the event that the ML model indicates that a fraud detection threshold is satisfied (e.g., a transaction is likely associated with fraud based on the value of the score meeting the threshold), a verification process for the payment card can be initiated by the subject system.

Moreover, the machine learning model can be implemented as one of the following examples: deep neural network, support vector machine, classification and regression tree, random forest, boosted tree, general chi-squared automatic interaction detector model, interactive tree, multi-adaptive regression spline, or naive Bayes classifier, among other types of machine learning models or techniques.

In example 730, interface 735 is shown for display on client device 108 including information (e.g., message) indicating a successful verification of the payment card by application server 122 based on at least the previous verification. Interface 735 is further shown including selectable graphical item 732 (e.g., payment submit button) that the user can select by providing the appropriate touch input.

Figure 8:
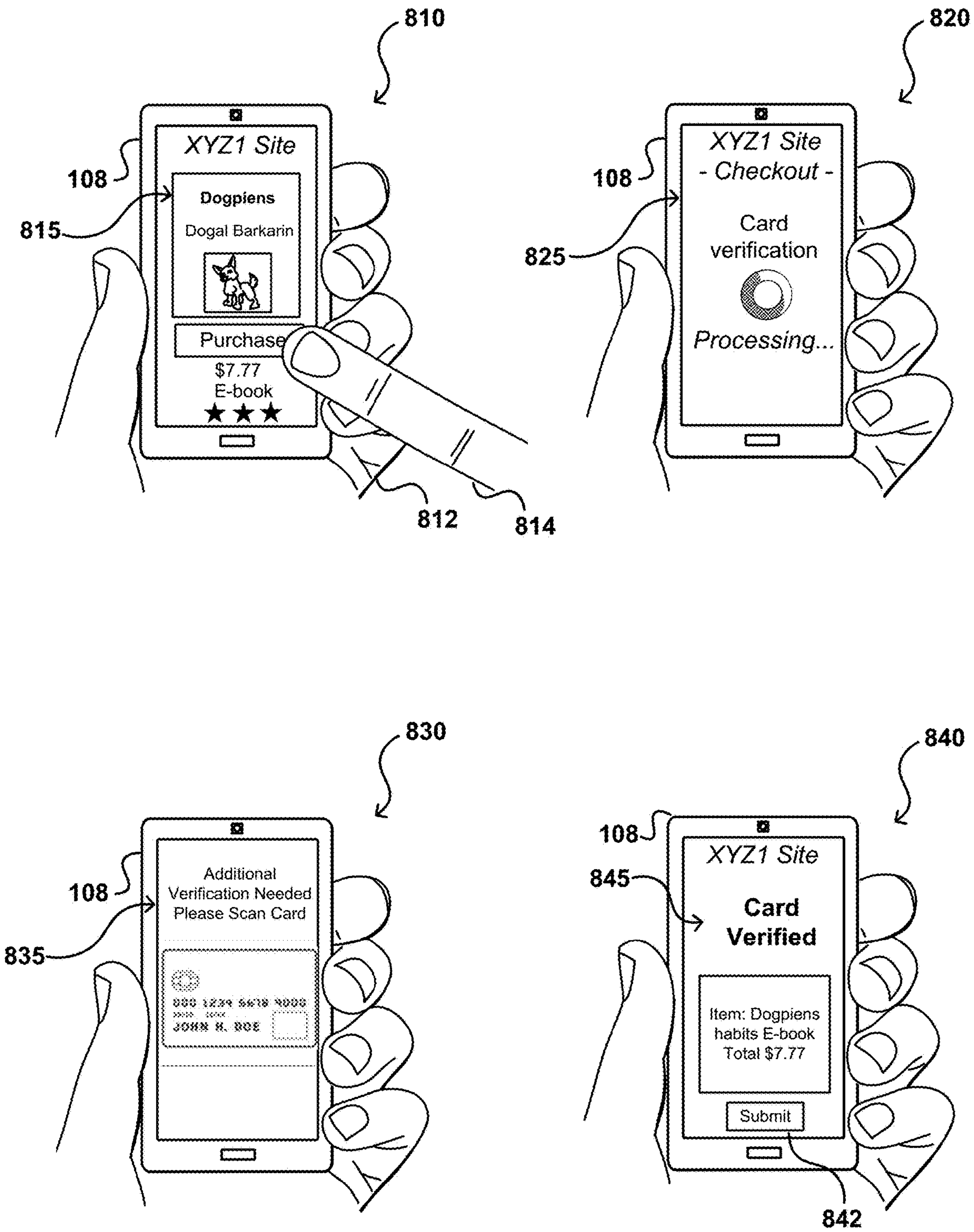
FIG. 8 conceptually illustrates examples of user interfaces for an additional verification of a payment card, according to example embodiments.

FIG. 8 conceptually illustrates examples of user interfaces for an additional verification of a payment card, according to example embodiments. Similar to FIG. 6 and FIG. 7, in the examples described in FIG. 8, client device 108 performs various operations for a verification process in conjunction with networked system 116 and is a continuation of the examples from FIG. 6 and FIG. 7 above.

As illustrated in example 810, interface 815 is shown for display on client device 108 where a hand 812 is holding client device 108. In an embodiment, interface 815 is rendered for display by client device 108 (e.g., in a viewport of an application executing on client device 108), which has occurred by navigating to a particular webpage of an online merchant (e.g., provided by "XYZ1 Site"). A finger 814 is shown to provide a touch input (e.g., tap) to a selectable graphical item (e.g., purchase button) in interface 815.

In example 820, interface 825 is shown for display on client device 108 as an indicator of the payment card being verified by application server 122. As mentioned before, application server 122 sends results of the verification process to client device 108, which can be processed by client device 108 and displayed in a new interface. As the payment card was previously verified (as discussed in FIG. 6 and FIG. 7), application server 122 retrieves the previously stored verification token and determines that another verification process should be performed for the payment card, which can be determined in view of the following.

As mentioned before and discussed further in FIG. 10 below, the application server 122 (or components thereof) can compute a score to determine an indicator of risk (e.g., probability of fraud) in accepting the previous payment card verification, which the online merchant can utilize to decide whether to initiate an additional verification process. For example, such a score when greater than a particular threshold value indicates to the online merchant that the risk in accepting the prior verification is greater than a set threshold value (e.g., corresponding to a configuration parameter that is set by the online merchant to require more or fewer additional payment card verifications), and that in such an instance an additional verification process should be initiated to mitigate processing a (likely) fraudulent transaction.

As illustrated in example 830, interface 835 is shown for display on client device 108 in response to determining that a payment card verification process is to be initiated.

In an example, the aforementioned threshold value is set using a configuration tool provided by the subject system. More specifically, the configuration tool enables adjusting the particular threshold value to correspond to a risk metric indicating a risk for processing a fraudulent transaction. In an example, a default value for the threshold value can be 0.65 (e.g., when the threshold value can be set from a range of 0.0 to 1.0), which is automatically utilized absent being configured to a different value using the configuration tool.

In some instances, a transaction can be blocked when the additional verification process fails. Although not illustrated, in such instances, a different interface is provided indicating the verification has failed and the transaction is therefore blocked. The subject system can then provide different ways to proceed after the blocked transaction. In an example, the subject system can restart the verification process to provide another attempt to successfully complete payment card verification. In a different example, the subject system can provide an interface to request that the user enter in details associated with the payment card (e.g., entering in the full card number, and the like). In another example, the system can cause the user to be logged out of the website associated with the transaction, or temporarily prohibit (e.g., based on an amount of time such as a few hours, a day, or a week) an IP address associated with the user to access the website. In yet another example, the subject system can provide an interface prompting the user to use a different payment card.

In example 840, interface 845 is shown for display on client device 108 including information (e.g., message) indicating a successful verification of the payment card by application server 122. Interface 835 is further shown including selectable graphical item 842 (e.g., payment submit button) that the user can select by providing the appropriate touch input to complete the transaction.

Figure 9:
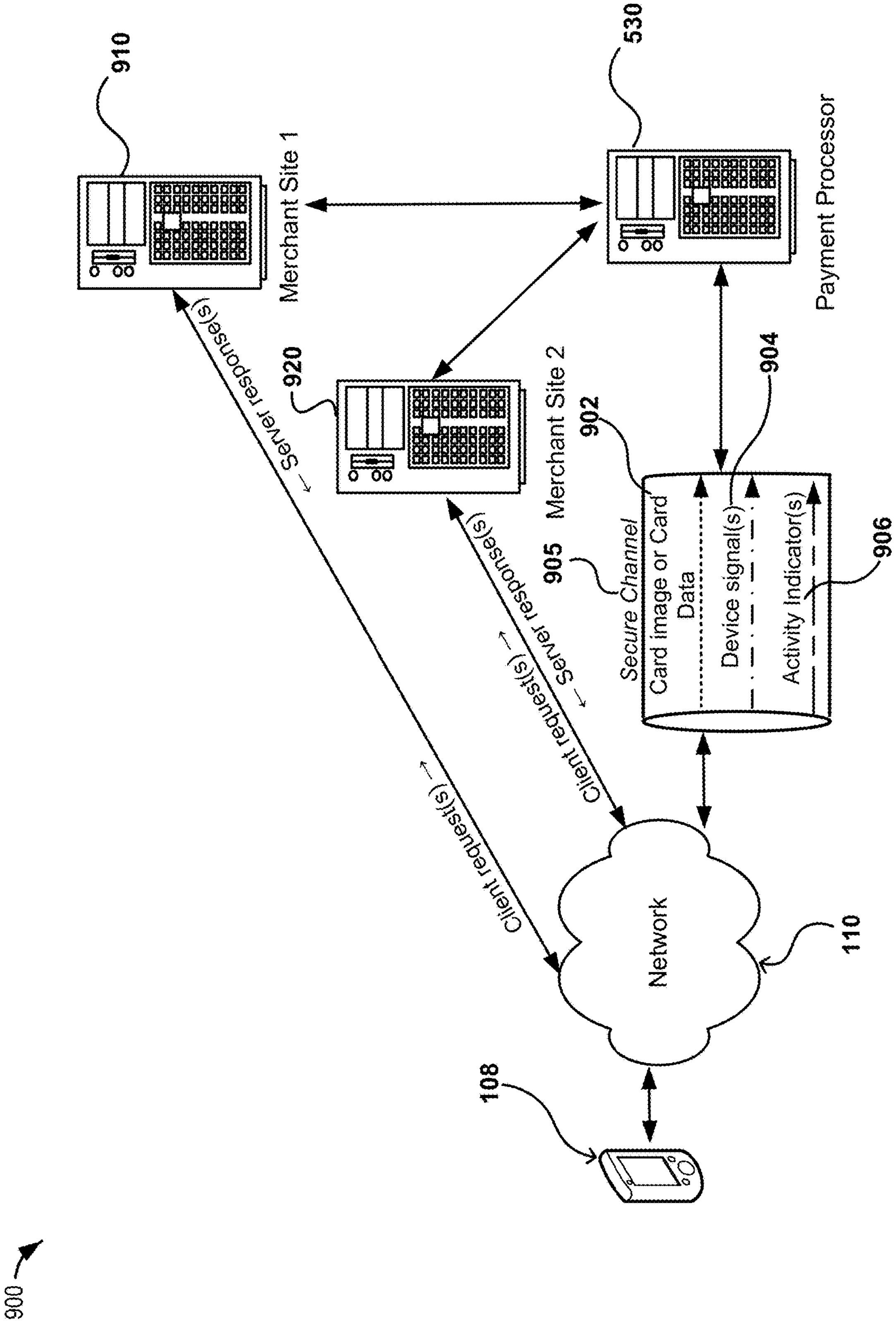
FIG. 9 illustrates an example computing environment involved with the examples described at least in FIG. 6, FIG. 7, and FIG. 8, according to example embodiments.

FIG. 9 illustrates an example computing environment 900 involved with the examples described at least in FIG. 6, FIG. 7, and FIG. 8, according to example embodiments.

As discussed before, application server 122 includes publication system 106 that provides payment processor component 300, which includes payment processor 530. In the example of FIG. 9, payment processor 530 is shown in computing environment 900 and described as performing some operations. It is appreciated, however, that application server 122 (or any of the aforementioned components e.g., publication system 106, payment processor component 300) can perform such operations instead of payment processor 530 in FIG. 9.

As shown, client device 108 can send requests over network 110 to a first merchant site 910 or second merchant site 920 for processing various transactions, and first merchant site 910 and second merchant site 920 can sent responses to such requests to client device 108. For the purposes of discussion below, first merchant site 910 corresponds to the online merchant discussed in FIG. 6 and second merchant site 920 corresponds to the different online merchant discussed in FIG. 7 and FIG. 8.

In an example, first merchant site 910 can request payment card verification to client device 108, which involves verifying an image of a payment card (e.g., captured or provided by client device 108). Since the image of the payment card can be considered sensitive data (e.g., where handling of such sensitive data is governed by various financial, privacy, or business regulations), after capturing image data of the payment card, client device 108 sends card image data or card data 902 over secure channel 905 to payment processor 530. In an embodiment, secure channel 905 is a secure (e.g., encrypted) communication link utilized to transfer data between client device 108 and payment processor 530. For example, secure channel 905 communicates using a Transport Layer Security (TLS) protocol to protect transmitted data through cryptographic measures (e.g., end-to-end encryption).

As further shown, a set of device signals 904 can be sent using the secure channel 905. As mentioned before and discussed further below, the set of device signals 904 can include device characteristics, information related to the transaction, various activity indicators, and the like. In the example of FIG. 9, a set of activity indicators 906 is shown separate from the set of device signals 904, but it can be understood that such activity indicators may be included with the set of device signals 904.

In an embodiment, the set of device signals 904 can be sent contemporaneously with or associated with a given transaction. In other instances, the set of device signals 904 can be sent asynchronously from a given transaction, which payment processor 530 can receive and store for future processing.

In an implementation, the set of device signals 904 can collected when the user visits webpages on first merchant site 910 or second merchant site 920 (e.g., using embedded JavaScript or code), and the set of device signals 904 is then sent over secure channel 905 to payment processor 530.

Continuing the payment card verification example, payment processor 530 receives card image data 902 and the set of device signals 904, which can be utilized to perform payment card verification (e.g., when the payment card has yet to be verified). In other instances, after the payment card has already been verified before, payment processor 530 receives a request (e.g., to determine whether payment verification should be initiated) from first merchant site 910 or second merchant site 920, and only the set of device signals associated with a current transaction (e.g., a subsequent transaction different from the previous transaction in which the payment card was initially verified).

In an embodiment, in response to the request from one of the merchant sites, payment processor 530 computes a score based at least in part on the set of device signals 904 (discussed further in FIG. 10) and whether the payment card was previously verified. In an example where the payment card has not been verified previously, payment processor 530 can assign a score of 1 (e.g., where the score can be a rational number with a range from 0 to 1), which indicates that payment verification is to be initiated, or in another example, payment processor 530 can assign a score greater than a particular threshold value indicating that payment verification is to be initiated.

Payment processor 530 can then, using network 110, provide the score to first merchant site 910 or second merchant site 920 depending on which online merchant is associated with the transaction. Based on the score, the online merchant can determine whether to initiate payment verification as discussed before and herein (e.g., when the score is greater than the particular threshold value discussed above). For example, in a instance where verification can be confirmed (e.g., potentially foregoing another verification process), the online merchant determines that the score is below another particular threshold value (e.g., a different value indicating a low probability of a fraudulent transaction and lower than the particular threshold value indicating payment verification is to be initiated) and accepts the score as sufficient to avoid a subsequent verification of the payment card.

Figure 10:
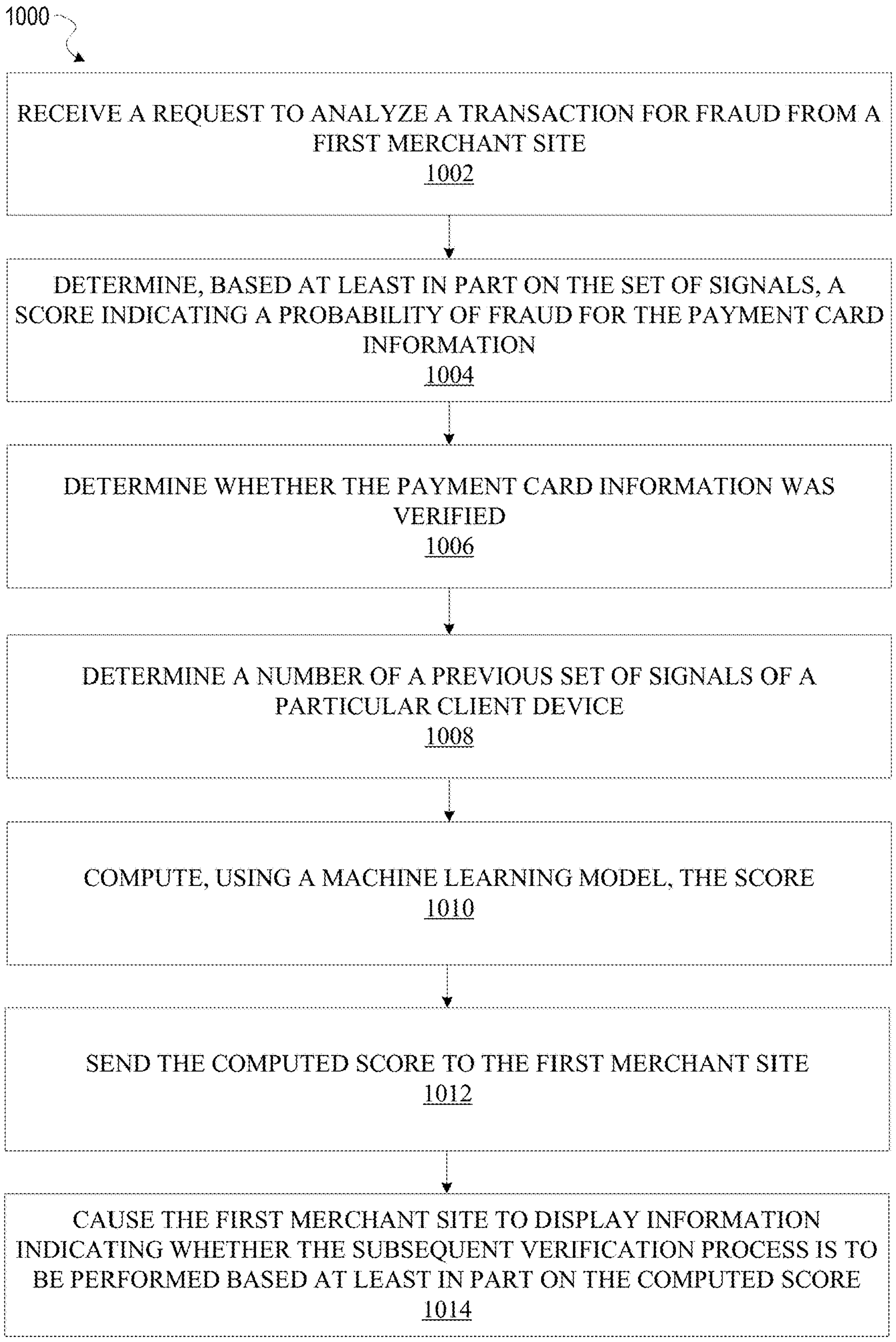
FIG. 10 is a flow diagram illustrating a method, in accordance with some embodiments of the present disclosure.

FIG. 10 is a flow diagram illustrating a method 1000, in accordance with some embodiments of the present disclosure. The method 1000 may be embodied in computer-readable instructions for execution by one or more hardware components (e.g., one or more processors) such that the operations of the method 1000 may be performed by components of networked system 116 (e.g., application server 122, publication system 106, payment processor 530), which include, at least in part, software architecture 306 and hardware layer 352. Accordingly, the method 1000 is described below, by way of example with reference thereto. However, it shall be appreciated that the method 1000 may be deployed on various other hardware configurations and is not intended to be limited to deployment within networked system 116. In the discussion below, payment processor 530 is mentioned, but as discussed above, any other component can perform the same operations including, as an example, application server 122, publication system 106, or other components discussed in FIGS.

At operation 1002, payment processor 530 receives a request to analyze a transaction for fraud from a first merchant site, the request including payment card information and a set of signals associated with a client device, and the set of signals includes a first set of device characteristics of the client device and a second set of activity indicators associated with the transaction.

In an embodiment, the device characteristics include at least one of a browser type, a network address, an operating system, a screen resolution, a geolocation, or a local time.

In an embodiment, the set of activity indicators includes one or more of a total session time of a session associated with the transaction, an amount of time for completing an electronic form, a second amount of time spent on a particular page of the first merchant site, a paste event being detected when the payment card information was provided during the session, or a set of metrics related to mouse activity during the session.

In an embodiment, prior to determining a score indicating a probability of fraud, payment processor 530 determines that the payment card was not previously verified (e.g., based on an absence of a verification token as discussed before in at least FIG. 6).

At operation 1004, payment processor 530 determines, based at least in part on the set of signals, a score indicating a probability of fraud for the payment card information with the transaction.

At operation 1006, in determining the score, payment processor 530 determines whether the payment card information was verified, based on information related to a different transaction at a different merchant site, at a previous time greater than a threshold period of time prior to a time of the transaction being received at the first merchant site.

In an example, the information related to the different transaction includes a type of payment card verification, in which the type of payment card verification indicates two-factor authentication, a security question, or capturing an image of a payment card as the type of verification.

At operation 1008, in determining the score, payment processor 530 determines a number of a previous set of signals of a particular client device associated with the different transaction that matches the set of signals of the client device.

At operation 1010, payment processor 530 computes, using a machine learning model, the score based at least in part on the determining whether the payment card information was verified, the number of the previous set of signals that match the set of signals, and the second set of activity indicators.

In an embodiment, a machine learning (ML) model is utilized during a given transaction to generate the above-mentioned score. For example, a transaction may be received or associated with a set of metadata (e.g., payment card number, email address, IP address, tracking cookie, previous transaction details, previous verification details, and the like). The metadata is provided as input data to the machine learning model to determine a likelihood of fraud associated with the transaction, which is generated as the score and then provided as output data from the ML model(s). This likelihood can be mapped to a range of values (e.g., between 0.0 and 1.0), or other value(s).

In an implementation, the machine learning model can be a deep neural network that generates a prediction (e.g., a score) based on various inputs. For example, techniques such as statistical profiling, histograms, clustering, nearest neighbor, Bayesian networks, support vector machines, and the like can be utilized in addition to or in conjunction with the machine learning model.

At operation 1012, payment processor 530 sends the computed score to the first merchant site, in which the computed score is utilized to determine whether to initiate a subsequent verification process for the payment card information with the client device. As mentioned before, the subsequent verification process includes at least capturing an image of a payment card corresponding to the payment card information.

At operation 1014, payment processor 530 causes the first merchant site to display information indicating whether the subsequent verification process is to be performed based at least in part on the computed score.

The following discussion relates to other examples involving payment processor 530.

In embodiment, payment processor 530 determines that the payment card information was verified in a prior transaction at the different merchant, and processes the transaction utilizing the payment information in response to determining that the payment card information was verified in the prior transaction at the different merchant.

In an embodiment, to determine that the payment card information was previously verified, payment processor 530 uses the previously stored verification token (e.g., as described above in at least FIG. 6) to confirm the previous verification.

In an embodiment, payment processor 530 determines that the computed score is greater than a first threshold value, the first threshold value corresponding to a particular threshold to initiate the subsequent verification process. In response to determining that the computed score is greater than the first threshold value, payment processor 530 causes the subsequent verification process to be performed by the first merchant site based at least in part on the computed score, the subsequent verification process including at least causing the first merchant site to display a user interface for the capturing of the payment card.

In an embodiment, payment processor 530 determines that the computed score is greater than a second threshold value, the second threshold value corresponding to a second particular threshold to block the transaction, the second threshold value being greater than the first threshold value. In an implementation, the aforementioned second threshold value is set using a configuration tool provided by the subject system. More specifically, the configuration tool enables adjusting the second particular threshold value to correspond to a risk metric indicating when to block a transaction. In an example, a default value for the second particular threshold value can be 0.75 (e.g., when the threshold value can be set from a range of 0.0 to 1.0), which is automatically utilized absent being configured to a different value using the configuration tool.

In response to determining that the computed score is greater than the second threshold value, payment processor 530 causes the first merchant site to display information indicating that the transaction has been blocked.

In some instances, different ways to proceed after the blocked transaction. In an example, the subject system can restart the verification process to provide another attempt to successfully complete payment card verification. In a different example, the subject system can provide an interface to request that the user enter in details associated with the payment card (e.g., entering in the full card number, and the like). In another example, the system can cause the user to be logged out of the website associated with the transaction, or temporarily prohibit (e.g., based on an amount of time such as a few hours, a day, or a week) an IP address associated with the user to access the website. In yet another example, the subject system can provide an interface prompting the user to use a different payment card.

The following discussion relates to various terms and phrases that are mentioned in the disclosure.

"Carrier Signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" (e.g., a processor 540 in FIG. 5) is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association-branded payment cards directly to consumers. An issuing bank assumes primary liability for the consumer's capacity to pay off debts they incur with their card.

"Payment Information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Sensitive information" may not necessarily be related to payment information and may include other confidential personal information, such as medical (e.g., HIPAA) information, for example. The ambit of the term "Payment Information" includes "Sensitive Information" within its scope. In some examples, sensitive payment information may include "regulated payment information," which may change over time. For example, currently a merchant cannot collect more than the first six (6) or the last four (4) numbers of a customer's PAN without generally needing to comply with Payment Card Industry (PCI) regulations. But card number lengths may change, and when they do, the "6 and 4" rules will likely change with them. These potential future changes are incorporated within the ambit of "regulated payment information," which is, in turn, included within the ambit of the term "payment information" as defined herein.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant (e.g., a merchant 510 of FIG. 5) and merchant servers (e.g., merchant servers 512 of FIG. 5) are associated with the merchant site. The merchant site is associated with a client-side application and a server-side application. In one example embodiment, the merchant site includes the merchant servers 512 of FIG. 5, and the server-side application executes on the merchant servers 512.

"Payment Processor" in this context (e.g., a payment processor 530 in FIG. 5) refers to an entity or a plurality of entities and associated software components and/or hardware components (e.g., hardware processors, virtual processors executing on top of hardware processors, servers, computing platforms, storage, security mechanisms, encryption hardware/devices), among other types of computing resources (e.g., network, bandwidth, CPU processing, and the like) that facilitate and process a transaction, for example between a merchant and a customer's electronic device. With reference to a high-level description illustrated in FIG. 5, in some examples described more fully below, the payment processor includes selected functionality of both the payment processor 530 and the processor 540/card networks 550. For example, the payment processor 530 creates tokens and maintains and verifies publishable (non-secret) keys and secret keys. In the illustrated example, the processor 540/card networks 550 are involved in authorizing or validating payment information. In one example embodiment, the payment processor 530 and the processor 540/card networks 550 function together to authorize and validate payment information, issue a token, and settle any charges that are made. Accordingly, in this embodiment, "payment processor" refers to the functionality of the payment processor 530 and the functionality of the processor 540/card networks 550. In another example embodiment, wherein step (3) in the high-level description is not performed, and the payment processor 530 performs its own verification before issuing a token, the processor 540/card networks 550 are still used for settling any charges that are made, as described in step (7). Accordingly, in this embodiment, "payment processor" may refer only to the functionality of the payment processor 530 with respect to issuing tokens. Further, in the example arrangement shown, the payment processor 530, the processor 540, and the card networks 550 are shown as separate entities. In some examples, their respective functions may be performed by two entities, or even just one entity, with the entities themselves being configured accordingly.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2020, Stripe, Inc., All Rights Reserved.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:

receiving, at a server over a data network, a first request from a website accessed via a first device to analyze that a first network operation at the website that utilizes information from a physical credential to authorize the first network operation is validly utilizing the information from the physical credential, wherein the first request includes first information representing characteristics of a device that initiated the first network operation and second information representing characteristics of activity conducted on the device that initiated the first network operation, wherein the first information includes at least one of a browser type, a network address, an operating system, or a screen resolution, and wherein the second information includes at least one of a first amount of time for completing an electronic form associated with the first network operation, a second amount of time spent on a particular page of the website associated with the first network operation, or a paste event being detected when the information from the physical credential was provided during a session associated with the first network operation;

generating, using a machine learning model, a probability that the first network operation is validly utilizing the information from the physical credential, wherein the machine learning model generates the probability based at least in part on when the physical credential was last verified in association with a threshold period of time for verification, the first information representing characteristics of the device in common with one or more previous network operations utilizing the information from the physical credential, and the second information representing the characteristics of activity conducted on the device in common with the one or more previous network operations utilizing the information from the physical credential, wherein the one or more previous network operations were originated from one or more different websites than the website;

utilizing the probability to determine whether a subsequent verification is needed to determine that the information from the physical credential is validly used for the first network operation; and when the subsequent verification is satisfied or when the subsequent verification is not needed, allowing the first network operation to proceed based on the information from the physical credential.

2. The method of claim 1, wherein the first information further includes a plurality of the browser type, the network address, the operating system, the screen resolution, a geolocation, or a local time.

3. The method of claim 1, wherein the second information further includes a plurality of the first amount of time for completing the electronic form associated with the first network operation, the second amount of time spent on the particular page of the website associated with the first network operation, a third amount of time indicating a total session time of the session associated with the first network operation, or the paste event being detected when the information from the physical credential was provided during the session associated with the first network operation.

4. The method of claim 1, wherein the subsequent verification includes an image capture of the physical credential, a two-factor authentication indicating an authorization to use the physical credential, or a predetermined security question associated with the physical credential.

5. The method of claim 1, wherein the first request includes a validation token, the validation token having previously been set during a prior network operation, wherein the machine learning model generates the probability further based at least in part on the validation token.

6. The method of claim 1, wherein utilizing the probability includes determining that the probability is greater than a first threshold value, the first threshold value corresponding to a particular threshold to initiate the subsequent verification.

7. The method of claim 6, wherein the first threshold value is determined by a provider of the website.

8. The method of claim 6, further comprising:

determining that the probability is greater than a second threshold value, the second threshold value corresponding to a second particular threshold to block the first network operation, the second threshold value being greater than the first threshold value.

9. The method of claim 8, wherein the second threshold value is set using a configuration tool interface provided by the server.

10. The method of claim 1, further comprising:

when the subsequent verification is not satisfied, blocking the first network operation and providing a remediation option, the remediation option including restarting the subsequent verification, providing an interface requesting information associated with the physical credential, forcing a log out of a user attempting to perform the first network operation from the website, or temporarily prohibiting an IP address associated with the user to access the website.

11. A non-transitory computer-readable medium having instructions stored thereon, which when executed by one or more processors, cause the one or more processors to:

receive, at a server over a data network, a first request from a website accessed via a first device to analyze that a first network operation at the website that utilizes information from a physical credential to authorize the first network operation is validly utilizing the information from the physical credential, wherein the first request includes first information representing characteristics of a device that initiated the first network operation and second information representing characteristics of activity conducted on the device that initiated the first network operation, wherein the second information includes at least one of a first amount of time for completing an electronic form associated with the first network operation or a paste event being detected when the information from the physical credential was provided during a session associated with the first network operation;

generate, using a machine learning model, a probability that the first network operation is validly utilizing the information from the physical credential, wherein the machine learning model generates the probability based at least in part on when the physical credential was last verified in association with a threshold period of time for verification, the first information representing characteristics of the device in common with one or more previous network operations utilizing the information from the physical credential, and the second information representing the characteristics of activity conducted on the device in common with the one or more previous network operations utilizing the information from the physical credential, wherein the one or more previous network operations were originated from one or more different websites than the website;

utilize the probability to determine whether a subsequent verification is needed to determine that the information from the physical credential is validly used for the first network operation; and when the subsequent verification is satisfied or when the subsequent verification is not needed, allow the first network operation to proceed based on the information from the physical credential.

12. The non-transitory computer-readable medium of claim 11, wherein the first information includes a plurality of the following: a browser type, a network address, an operating system, a screen resolution, a geolocation, or a local time, and wherein the second information further includes a plurality of the following: the first amount of time for completing the electronic form associated with the first network operation, a second amount of time spent on a particular page of the website associated with the first network operation, a third amount of time indicating a total session time of the session associated with the first network operation, or the paste event being detected when the information from the physical credential was provided during the session associated with the first network operation.

13. The non-transitory computer-readable medium of claim 11, wherein the subsequent verification includes an image capture of the physical credential, a two-factor authentication indicating an authorization to use the physical credential, or a predetermined security question associated with the physical credential.

14. The non-transitory computer-readable medium of claim 11, wherein the first request includes a validation token, the validation token having previously been set during a prior network operation, wherein the machine learning model generates the probability further based at least in part on the validation token.

15. The non-transitory computer-readable medium of claim 11, wherein utilizing the probability includes determining that the probability is greater than a first threshold value, the first threshold value corresponding to a particular threshold to initiate the subsequent verification, wherein the first threshold value is determined by a provider of the website.

16. The non-transitory computer-readable medium of claim 15, wherein the instructions further cause the one or more processors to:

determine that the probability is greater than a second threshold value, the second threshold value corresponding to a second particular threshold to block the first network operation, the second threshold value being greater than the first threshold value.

17. The non-transitory computer-readable medium of claim 11, wherein the instructions further cause the one or more processors to:

when the subsequent verification is not satisfied, block the first network operation and provide a remediation option, the remediation option including restarting the subsequent verification, providing an interface requesting information associated with the physical credential, forcing a log out of a user attempting to perform the first network operation from the website, or temporarily prohibiting an IP address associated with the user to access the website.

18. A server comprising:

a computer-readable medium; and one or more processors, wherein the one or more processors are configured to perform a process including:

receiving, at the server over a data network, a first request from a website accessed via a first device to analyze that a first network operation at the website that utilizes information from a physical credential to authorize the first network operation is validly utilizing the information from the physical credential, wherein the first request includes first information representing characteristics of a device that initiated the first network operation and second information representing characteristics of activity conducted on the device that initiated the first network operation, wherein the second information includes at least one of a first amount of time for completing an electronic form associated with the first network operation or a paste event being detected when the information from the physical credential was provided during a session associated with the first network operation;

generating, using a machine learning model, a probability that the first network operation is validly utilizing the information from the physical credential, wherein the machine learning model generates the probability based at least in part on when the physical credential was last verified in association with a threshold period of time for verification, the first information representing characteristics of the device in common with one or more previous network operations utilizing the information from the physical credential, and the second information representing the characteristics of activity conducted on the device in common with the one or more previous network operations utilizing the information from the physical credential, wherein the one or more previous network operations were originated from one or more different websites than the website;

utilizing the probability to determine whether a subsequent verification is needed to determine that the information from the physical credential is validly used for the first network operation; and when the subsequent verification is satisfied or when the subsequent verification is not needed, allowing the first network operation to proceed based on the information from the physical credential.

19. The server of claim 18, wherein the first information includes a plurality of the following:

a browser type, a network address, an operating system, a screen resolution, a geolocation, or a local time, and wherein the second information further includes a plurality of the following: the first amount of time for completing the electronic form associated with the first network operation, a second amount of time spent on a particular page of the website associated with the first network operation, a third amount of time indicating a total session time of the session associated with the first network operation, or the paste event being detected when the information from the physical credential was provided during the session associated with the first network operation.

20. The server of claim 18, wherein utilizing the probability includes determining that the probability is greater than a first threshold value, the first threshold value corresponding to a particular threshold to initiate the subsequent verification, wherein the first threshold value is determined by a provider of the website.

* * * * *